United States Patent
Armbruster

(10) Patent No.: US 8,457,776 B2
(45) Date of Patent: Jun. 4, 2013

(54) METHOD AND SYSTEM FOR MATERIAL TRANSPORT

(75) Inventor: Steffen Armbruster, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 1797 days.

(21) Appl. No.: 10/535,038

(22) PCT Filed: Oct. 27, 2003

(86) PCT No.: PCT/DE03/03566
§ 371 (c)(1),
(2), (4) Date: May 12, 2005

(87) PCT Pub. No.: WO2004/044609
PCT Pub. Date: May 27, 2004

(65) Prior Publication Data
US 2006/0104800 A1 May 18, 2006

(30) Foreign Application Priority Data
Nov. 12, 2002 (DE) .................................. 102 52 901

(51) Int. Cl.
*G06F 7/00* (2006.01)

(52) U.S. Cl.
USPC .......................................... 700/214; 700/213

(58) Field of Classification Search
USPC ..................................... 700/213, 214; 701/25
See application file for complete search history.

(56) References Cited

U.S. PATENT DOCUMENTS

| 4,247,922 | A | | 1/1981 | Jackson et al. |
| 5,329,449 | A | * | 7/1994 | Tanizawa et al. ................ 701/25 |
| 5,542,028 | A | | 7/1996 | Minami |
| 5,774,876 | A | * | 6/1998 | Woolley et al. .................. 705/28 |
| 5,943,476 | A | | 8/1999 | Dougherty et al. |
| 5,974,348 | A | | 10/1999 | Rocks |
| 6,208,916 | B1 | | 3/2001 | Hori |
| 6,965,823 | B2 | * | 11/2005 | Wichner ......................... 701/59 |
| 2004/0010337 | A1 | * | 1/2004 | Mountz .......................... 700/214 |

FOREIGN PATENT DOCUMENTS

| DE | 37 41 259 A1 | 6/1989 |
| DE | 38 21 892 C1 | 2/1990 |
| DE | 195 40 928 A1 | 5/1997 |
| EP | 0 753 169 B1 | 1/1997 |
| WO | WO 97/08628 | 3/1997 |

* cited by examiner

*Primary Examiner* — Ramya Burgess

(57) ABSTRACT

The invention relates to a method and a system for material transport, whereby at least one mobile transport means is detected by means of a detection device, comprising a radar or laser detecting device. Position coordinates, position angles and speed of the transport means are determined by means of a reference coordinate system and transmitted to a stationary data processing device. A central material tracking with verification of storage location is generated by means of the data processing device, whereby, particularly with use of the positing angle, the storage type for the material can be automatically determined. Operator input for the complete description of the material storage is not necessary.

10 Claims, 2 Drawing Sheets

METHOD AND SYSTEM FOR MATERIAL TRANSPORT

CROSS REFERENCE TO RELATED APPLICATIONS

This application is the US National Stage of International Application No. PCT/DE2003/003566, filed Oct. 27, 2003 and claims the benefit thereof. The International Application claims the benefits of German application No. 10252901.9 filed Nov. 12, 2002, both applications are incorporated by reference herein in their entirety.

FIELD OF THE INVENTION

The invention relates to a method and a system for transporting material in industrial plants, in particular in the basic goods or paper industries, at least one mobile transport means being detected using at least one data processing device.

BACKGROUND OF THE INVENTION

In the basic goods or primary industry in particular, e.g. in sectors of industry where metal or steel are processed, or in the paper industry mobile transport means such as forklift trucks or heavy load stacker trucks are used to transport material between manufacturing and/or storage units. The operators of the transport means thereby generally have to detect the location for depositing or picking up material manually. Incorrect input or operating error can result in incorrect entries and even stoppages and incur significant costs.

SUMMARY OF THE INVENTION

The object of the invention is to avoid the disadvantages of material transport described above, in particular within an industrial unit.

According to the invention the object is achieved on the one hand by a method of the type mentioned above, a detection device connected to the transport means emitting signals and signals being sent back to the detection device by response units, the detection device determining the position coordinates and position angle of the transport means using at least one reference coordinates system. On the other hand the object is achieved according to the invention by a material transport system, the material transport system having at least one data processing device and at least one detection device to detect at least one mobile transport means, the detection device being connected to a transport means and having means for sending and receiving signals and stationary response units being provided, which in particular receive signals from the detection device and send back signals, by means of which the detection device determines in particular the current position coordinates, the position angle and preferably also the current speed of the transport means, using at least one reference coordinates system.

The position coordinates, position angle and in some instances current speed are advantageously determined in real time or almost in real time.

Advantageous developments of the method according to the invention and the material transport system according to the invention are specified in the dependent claims and are described in more detail below with reference to exemplary embodiments.

A module for the preferably automatic calibration of the position coordinates of the transport means to a material-relevant point is advantageously provided. This allows particularly accurate material tracking even for different types of material, transport means and transport modes.

The data processing device advantageously has a module for supplementing the position coordinates with at least one area identifier. It is also expedient for the stationary data processing device to have a device for providing and preferably also verifying a storage inventory with discrete storage locations. This makes it possible to manage material and/or storage in such a manner that allows automatic identification of the locality by area or warehouse-wide for the transport of material.

The data processing device advantageously has a module for determining the type of storage of the material based on the position angle. This makes it possible to detect and track material and its type of storage automatically without requiring operator input.

The detection device is advantageously configured as a radar device, as this ensures particularly reliable and non-vulnerable detection of position coordinates, position angle or current speed of the transport means.

A data processing device connected to the transport means is advantageously connected to a device for the visual display of transport instructions or position and/or material information or preferably has such a device as part of it. This makes transport instructions, warnings and/or information of any sort particularly easily accessible for an operator of the transport means.

Advantages of the method according to the invention in particular will emerge in a similar manner to the advantages specified in relation to the material transport system according to the invention.

Further advantages and details of the system or method according to the invention will emerge from the description which follows of exemplary embodiments with reference to the drawings and in conjunction with the claims.

DETAILED DESCRIPTION OF THE INVENTION

Figure 1:
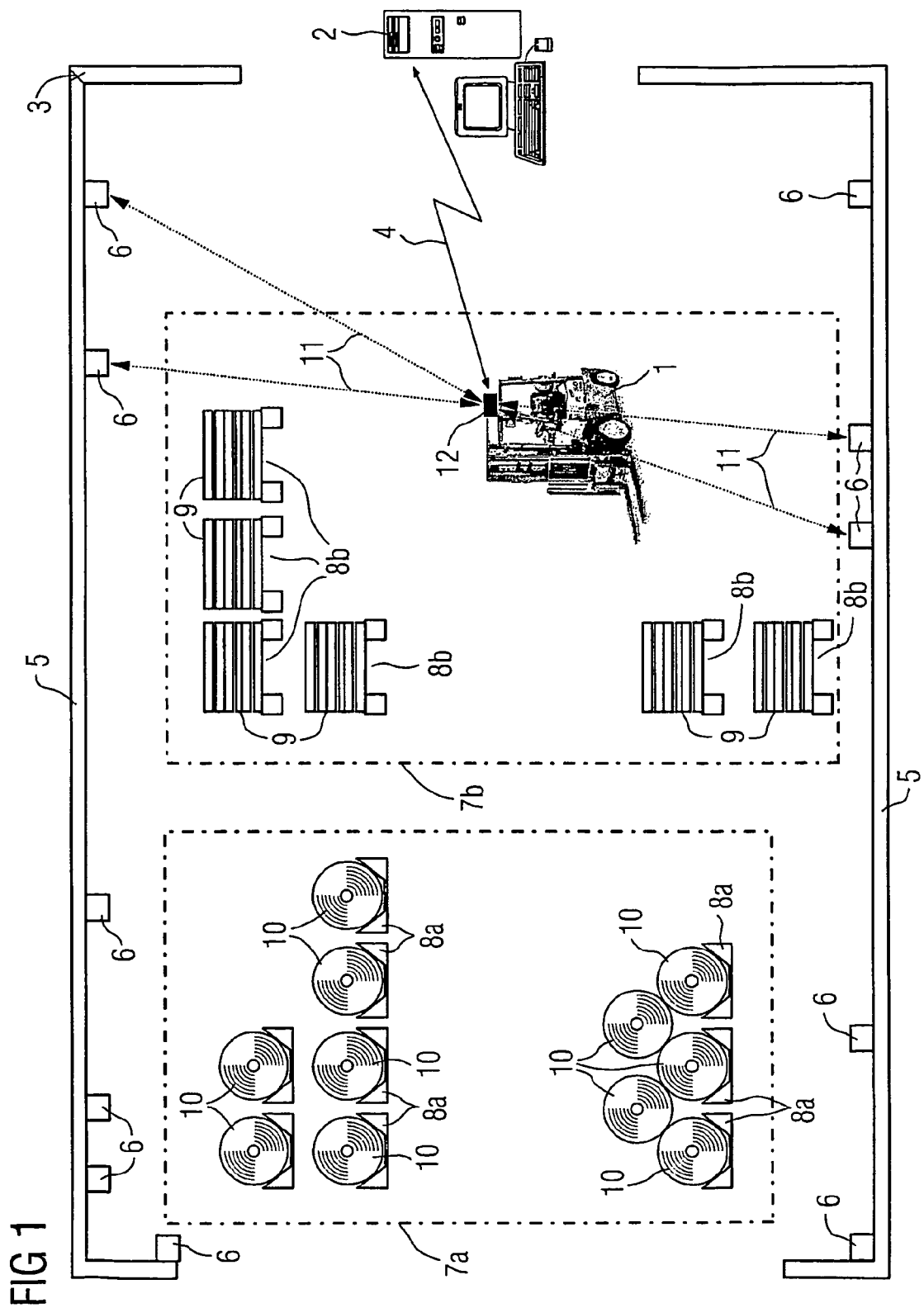
FIG. 1 shows an exemplary-illustration of a material transport system according to the invention.

FIG. 1 shows a section of an industrial unit, in which a material transport method according to the invention and/or a material transport system according to the invention is/are used. The industrial unit can thereby be subdivided into different areas, e.g. different buildings or surfaces, at least some of which may be in the open air. A spatial subdivision can also be carried out on the basis of areas assigned to individual or more than one production or storage process. The method or system according to the invention for the transport of material can be used in conjunction with production, loading, storage and other units. The invention is described below using the example of a storage warehouse bounded by 5 walls.

Each point of the storage unit can be described uniquely by specifying its Cartesian coordinates. In the example the storage unit is subdivided into two areas 7a, 7b, each of which has a plurality of loading and unloading points or storage locations 8a, 8b. The storage locations 8a in the area 7a are configured such that wound material 10 is preferably stored there. The storage locations 8b in the area 7b in contrast are preferably configured for the storage of sheet material 9.

Material 9 or 10 is transported by means of a mobile transport means 1, i.e. by means of a heavy load stacker truck or a forklift truck for example, between the storage locations 8a, 8b and loading, production or other storage units, which are outside the boundaries 5, i.e. in the example outside the walls 5. Transport means used in the basic goods and paper industries generally move faster than so-called AGVs (automated guided vehicles).

The entire storage unit 5, 7a, 7b, 8a, 8b and the material 9, 10 are mapped on a reference coordinates system with a reference point 3 by means of a data processing device, preferably a stationary data processing device 2. FIG. 1 shows a single reference point for the areas 7a and 7b. It is however also possible to define a specific reference point for each of the areas. Further areas of the industrial unit are not shown in further detail in the drawings. One or a plurality of common and/or specific reference points can be provided for further areas. A mixture of common and specific reference points is also possible.

A detection device 12 is attached to the transport means 1 to determine the position coordinates of the transport means 1 and the material transported, deposited or picked up by it and the angle of approach. Response units 6 are also positioned in a stationary manner in the industrial plant, such as transponders attached to the walls 5.

Mobile transport means 1 are for example vehicles with drivers, such as stacker trucks or automatically controlled vehicles. Transported material is for example rolls of paper or wound material such as coils in hot or cold 10 bundles or sheet material 9, such as sheet metal stacked with pallets or for example split bundles on pallets.

The transport means 1 preferably has a data processing device, e.g. a host PC, which may be located for example inside the cabin of the transport means 1. This data processing device is linked wirelessly or by cable for example to the detection device 12. The data processing device of the transport means 1 is linked by means of a wireless connection 4, e.g. wireless LAN, a wireless local network, to a stationary data processing device 2. Preferably the detection device 12 can alternatively or additionally be linked wirelessly to the stationary data processing device 2 at the same time.

The detection device 12 advantageously has a radar module, operating preferably in the ISM frequency band. The detection device 12 thereby assumes the role of a base station and locates the response units 6 arranged in the active range of the vehicle based on the radar principle. The response units 6 are preferably configured as transponders and are for example configured such that they respond in a specific manner to the base station. The response units 6 are preferably active components in respect of their action principle. The detection device 12 determines the current position in the reference coordinates system continuously based on a plurality of feedback responses from one or a plurality of response units, as well as preferably also detecting the specific speed or current position angle of the transport means 1 or the material 9, 10 preferably as well. Position can also alternatively be determined using a visual detection device, the response units 6 being configured using reflective film or similar materials. Position determination according to the invention based on the radar principle has however proven particularly advantageous when used in the open air and when used in buildings of significant length.

Figure 2:
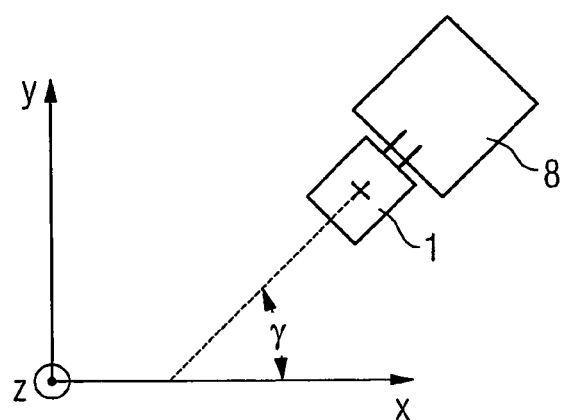
FIG. 2 shows a schematic illustration relating to a reference coordinates system and the position angle.

FIG. 2 shows a transport means 1 and a storage location 8. A material pick-up point can be defined respectively for different transport means 1 and materials 9 or 10, e.g. in relation to the tip of a mandrel in the case of heavy load stacker trucks or in relation to the center of the fork ends in the case of stacker trucks with forks. The material pick-up point thereby does not generally correspond to the coordinates determined by the detection device 12 for its own position based on its mounting point on the transport means 1. Calibration of the coordinates to a material-relevant point, i.e. for example the material pick-up point takes place automatically based on the selected transport means or material.

The current coordinates of the transport means 1 or the material 9, 10 are determined with reference to the respective reference point 3. Not only the planar position coordinates x and y but also the height z is thereby taken into account. The height z thereby preferably corresponds to the deposited height of the material 9, 10. Detecting the current position angle γ of the transport means 1 in relation to the storage location, i.e. approaching from left, right, rear or front for example, determines the direction in which the material was or is deposited. It is therefore possible to detect the position of labels for example or for example to detect whether coils are stored with the winding direction to the left or right. This allows the transport of material without or largely without operator intervention and it is thereby ensured that material is supplied correctly for further processing in subsequent production units.

The stationary data processing device 2 is used to provide a full and correct storage inventory, in particular as operators involved in transportation for example do not have to input coordinates to describe material pick-up and/or unloading points. Transport can be controlled via the data processing device 12. Transport instructions, position and/or material information can quickly be made accessible to operators by means of a data processing device connected to the transport means 1 and visual display means. Warnings of an incorrect material pick-up and/or deposit due to an operating error can thus be displayed immediately to the operator and corrected by said operator. If an operator deposits material incorrectly despite a warning, at least the incorrect location of the material deposit is recorded correctly in the system.

A module is provided, which supplements the position coordinates with at least one area identifier. This ensures that the method or transport system according to the invention can also be used in large-scale industrial units with different areas, a plurality of boundaries, extensive or complex subdivision and/or a large number of production, loading, storage or other units.

The method or system for material transport according to the invention allows unique verification of a storage location and the type of storage. For the first time there is no need for operator input for a complete description of material storage.

The invention claimed is:

1. A material transport monitoring system for use in and about a facility, for monitoring the movement of material by a transport mechanism, comprising: a first data processing device; at least one detection device for providing information determinative of planar position coordinates of the mobile transport mechanism, wherein the detection device is mountable to the transport mechanism, wherein the detection device has means for sending and receiving signals; a second data processing device positionable on or within the transport mechanism; a plurality of response units positioned at fixed locations about the facility and cooperatively coupled with the detection device to provide the information determinative of coordinates;

one or more wireless links for effecting data transfer from the detection device to the first data processing device and for effecting communication between the first and second data processing devices, wherein upon receiving signals from the detection device the response units provide signals to the detection device, by means of which position coordinates of the transport mechanism are determinable and locations of material can be determined;

wherein the data processing device connected to the transport mechanism is connected to a device for the visual display of transport instructions, position, and/or material information.

2. The material transport monitoring system according to claim 1 configured to determine the current speed of the transport mechanism.

3. The material transport monitoring system according to claim 1, wherein the data processing device and/or the detection device is capable of calibrating the position coordinates of the transport mechanism to a material-relevant point.

4. The material transport monitoring system according to claim 1, configured to provide position coordinates with at least one area identifier.

5. The material transport monitoring system according to claim 1, configured to determine a type of storage of the material from the position angle.

6. The material transport monitoring system according to claim 1, wherein the detection device is configured as a radar device.

7. The material transport monitoring system according to claim 1, wherein the detection device provides current position information to the first data processing device for determination of current speed and position angle of the transport mechanism.

8. The material transport monitoring system according to claim 1, configured to define material pick-up points with respect to a material-relevant point on the transport mechanism.

9. The material transport monitoring system according to claim 8 configured to: define material relevant points for different types of transport mechanisms including stacker trucks; define elevation coordinates in conjunction with the planar position coordinates; and determine a position angle of the transport mechanism relative to a storage location.

10. The material transport monitoring system according to claim 9 configured to verify and provide storage inventory information according to discrete storage locations.

* * * * *